April 21, 1953   J. J. BLACK   2,635,771
ELEVATOR APPARATUS FOR VEHICLES

Filed Jan. 17, 1950   9 Sheets-Sheet 1

INVENTOR.
BY James J. Black
Wood, Arey, Herron & Evans
ATTORNEYS.

April 21, 1953     J. J. BLACK     2,635,771
ELEVATOR APPARATUS FOR VEHICLES Filed Jan. 17, 1950     9 Sheets-Sheet 3

Fig. 3

INVENTOR.
BY James J. Black
Wood, Arey, Herron & Evans
ATTORNEYS.

April 21, 1953  J. J. BLACK  2,635,771

ELEVATOR APPARATUS FOR VEHICLES

Filed Jan. 17, 1950  9 Sheets-Sheet 5

INVENTOR.
James J. Black

Wood, Arey, Herron & Evans
ATTORNEYS.

April 21, 1953            J. J. BLACK            2,635,771

ELEVATOR APPARATUS FOR VEHICLES

Filed Jan. 17, 1950            9 Sheets-Sheet 6

INVENTOR.
James J. Black
BY Wood, Arey, Herron & Evans
ATTORNEYS.

INVENTOR.
James J. Black
BY Wood, Arey, Herron & Evans
ATTORNEYS.

Patented Apr. 21, 1953

2,635,771

UNITED STATES PATENT OFFICE 2,635,771

ELEVATOR APPARATUS FOR VEHICLES

James J. Black, Cincinnati, Ohio, assignor to The Kroger Co., Cincinnati, Ohio, a corporation of Ohio Application January 17, 1950, Serial No. 139,099

21 Claims. (Cl. 214—75)

This invention relates to elevator equipment for freight vehicles such as trailers and trucks and resides more particularly in a power driven, automatically controlled elevator arranged to operate between the ground level and two or more load sustaining elevations within the vehicle itself. In a preferred embodiment of the invention, the body of the vehicle is equipped with two sets of rails, arranged to support the load in horizontal tiers one above the other within the vehicle, and the elevator is arranged to level itself automatically with selected sets of rails to permit the merchandise to be shifted conveniently from the rails to the elevator and then lowered to the ground.

Although the apparatus can be used both for loading and unloading in general freight handling, it is of more particular utility in conjunction with a prearranged transportation system having warehouse facilities which include upper and lower conveyor rails arranged to mate with the upper and lower load support rails in the vehicle body. The load is transported upon the conveyor rails by means of pallets which track upon the rails and which can be shifted into the vehicle with the freight resting upon them. Such an arrangement permits the vehicle to be backed into loading position with its rails in endwise registry with the conveyor rails for direct transfer of the loaded pallets into the vehicle, and with the elevator inactive. This mode of operation permits the vehicle to be loaded in a fraction of the time otherwise required, and permits the individual pallets to be unloaded conveniently at the points to which they are dispatched by shifting them from the rails to the elevator to be lowered to the ground level.

By way of example, a system of this type has been profitably employed in transporting merchandise from a central warehouse to the individual stores of a retail grocery chain. In this case, the cartons of merchandise are stacked in orderly arrangement upon the pallets at the warehouse and transported from the warehouse to the loading docks upon conveyor rails for direct transfer into trailers. At the stores the pallets are unloaded individually by the elevator upon hand operated lift trucks to be hauled into the store for unloading.

In general, the apparatus consists of an elevator assembly mounted at the rear end of a vehicle with pallet rails extending lengthwise through the vehicle body, a power operated hoist unit connected to the elevator for moving it vertically between the ground level and the pallet rails, and a push button arrangement which causes the elevator either to rise automatically and level itself into alignment with selected pallet rails or to descend from the rails to the ground level and stop. The vehicle includes rear doors which are closed when the vehicle is in transit and the elevator includes pivotally mounted pallet support arms which may be extended rearwardly of the vehicle in a position to support the pallets when the elevator is in service but which may be folded to a flat position conveniently to permit the vehicle to be backed into loading position against a loading dock and to permit the doors to be closed when the vehicle is in transit.

A primary object of the invention has been to provide an automatic elevator system which permits the vehicle to be loaded and unloaded quickly and efficiently, thereby to increase the actual hauling capacity of the vehicle by reducing the time ordinarily lost in loading and unloading it. Further objects have been to improve the elevator structurally to permit its support arms to be extended for operation or folded for loading and transit quickly and conveniently; to provide a push button operated control system of simplified design for automatic operation of the elevator; and to provide in conjunction with the control system an arrangement of positive solenoid operated mechanical latches which sustain the elevator in accurate alignment with the pallet rails which it serves independently of the cables which sustain the elevator during its movements. An additional object has been to incorporate in the control system an automatic arrangement by which the elevator is lowered until it rests upon the ground with the pallet sustained at a fixed elevation above the ground level to permit the insertion of a lift truck beneath the pallet; the apparatus thus compensates automatically for variations in the ground level which normally interfere seriously with the efficient operation of a vehicle elevator of this nature.

Briefly, the apparatus consists of an elevator assembly including shoes which are slidably confined in the rear corner posts of the trailer frame and suspended by cables which pass over idler sheaves to a hoist unit mounted beneath the trailer floor. The hoist unit and its control circuit is energized electrically by power conducted from the service outlets at the retail stores, the connection being made by an extension cord which is plugged into the service outlet and into a receptacle installed in the vehicle which conducts the current to the hoist unit and its control circuit. Movements of the elevator are regulated by the control circuit and its push buttons for selectively moving the elevator to ground level from the first and second pallet rails or from the rails to the ground level. The system is so arranged that the elevator will descend from either the first or second level pallet rails to the ground and conversely from the ground to either of the selected levels; however, it will not descend from the upper set of pallet rails to the lower because this is not necessary in the normal operation of the apparatus.

By the provision of the mechanical latches the elevator is levelled accurately with respect to its cooperating pallet rails whereby the stretching of the elevator cables after prolonged usage does not interfere with the alignment of the elevator with the rails. In conjunction with the mechanical latches, there is provided a pair of slack cable switches which are associated with the cables so as to respond to looseness in the cables to deenergize the hoist unit when the elevator encounters the mechanical latches at the pallet rails or when it rests upon the ground. These switches therefore preserve the accurate registration of the elevator with its pallet rails and also perform a levelling function with respect to the ground level to compensate for irregularities which are encountered normally in the operation of a road vehicle.

The control system which regulates the operation of the hoist unit includes limit switches at the first and second pallet rails which are actuated by the elevator itself and these switches are interconnected in the control circuit to deenergize the circuit when the elevator reaches the selected pallet rail level. In order to latch the elevator mechanically at its selected level, as above noted, the elevator is travelled a slight distance above the latch which is to support it and encounters a limit switch which conditions the circuit to reverse the hoist motor, causing the elevator to be lowered into positive engagement with the latches. Upon engagement therewith, the cables become slack and permit the slack line switches to condition the control circuit to deenergize the hoist unit with the elevator supported by the latches. The elevator there remains at rest until the ground level button is depressed. When this occurs, the control circuit will cause the hoist unit to raise the elevator sufficiently to encounter the limit switches; also coincidentally, the solenoids for the mechanical latches are energized to retract the latches out of engagement with the elevator to permit the elevator to descend.

The control circuit operates on the same voltage as the hoist motor to simplify the apparatus and the control circuit is automatically deenergized by a door operated switch which is associated with one of the rear doors of the vehicle to open the circuit automatically when the door is closed. This switch also includes a manually operated button which may be depressed to deenergize the circuit and stop the elevator should an emergency develop while the apparatus is in operation.

When the trailer is in transit, the elevator is placed at the lower or floor level which corresponds to the lower edge of the doors and its supporting arms are folded in flat position so that the doors may be closed over them. The doors are provided with latches which engage keepers, one of which is secured to the trailer body at the top, the lower keeper being mounted upon the elevator so that the lower edge of the doors are thus locked to the elevator.

From the foregoing and from the following detailed description with reference to the drawings, those skilled in the art will comprehend readily the various modifications of which the apparatus is susceptible.

Figure 2:
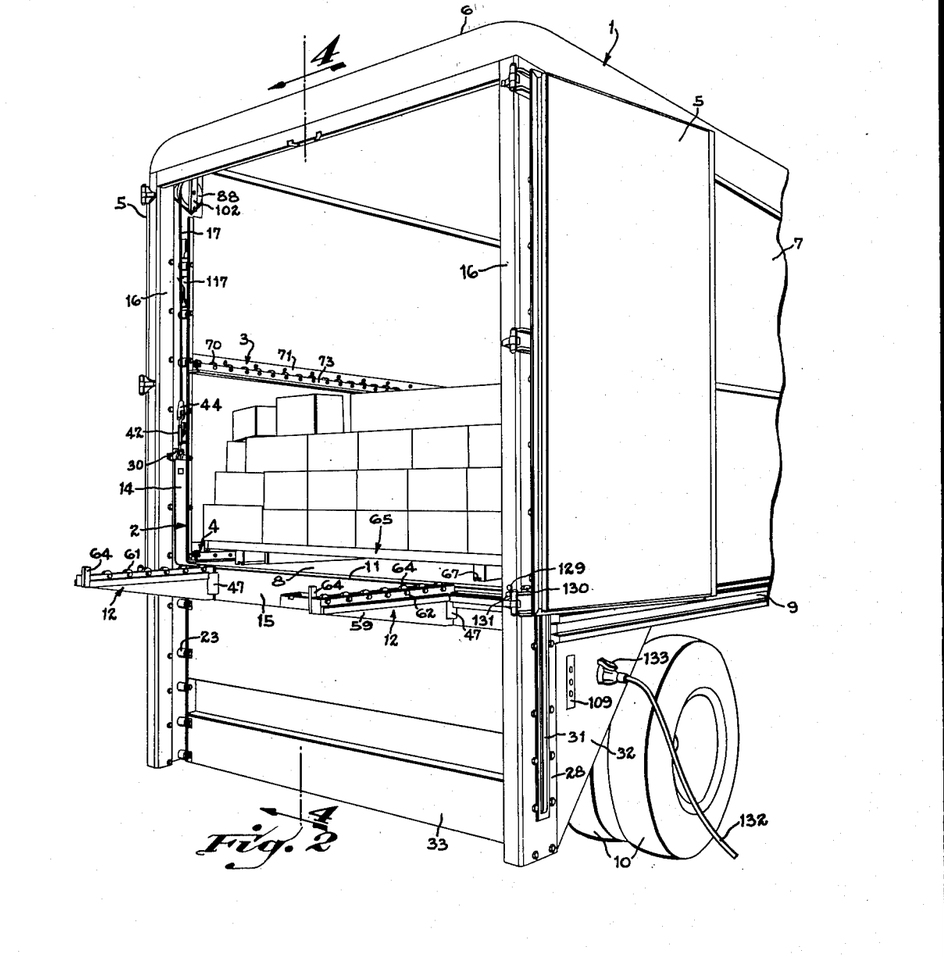
Figure 2 is a perspective view similar to Figure 1 with the doors open and the lift arms extended in operating position.

The elevator apparatus is illustrated and described in conjunction with a trailer vehicle as a preferred embodiment; however, it is contemplated to apply the structure in the same manner to trucks and other vehicles. Referring to Figure 2, the trailer body is indicated generally at 1, the elevator assembly at the rear end of the body is generally indicated at 2, and the upper and lower pairs of pallet rails which support the load are indicated at 3 and 4 respectively. The rearward end of the trailer is provided with doors 5—5 hingedly mounted to the side walls and adapted to be swung to the open position shown during the loading and unloading operations. Since the specific construction of the trailer body is not the subject of the invention, only so much of the body as is necessary to disclose the invention has been illustrated. In general, the body consists of a roof 6, a pair of side walls 7—7, and a floor 8 which is mounted upon the trailer frame 9 in the usual manner. The frame includes road wheels 10 at its rearward end and its forward end is supported upon the tractor by means of the usual fifth wheel construction.

Elevator structure

Figure 1:
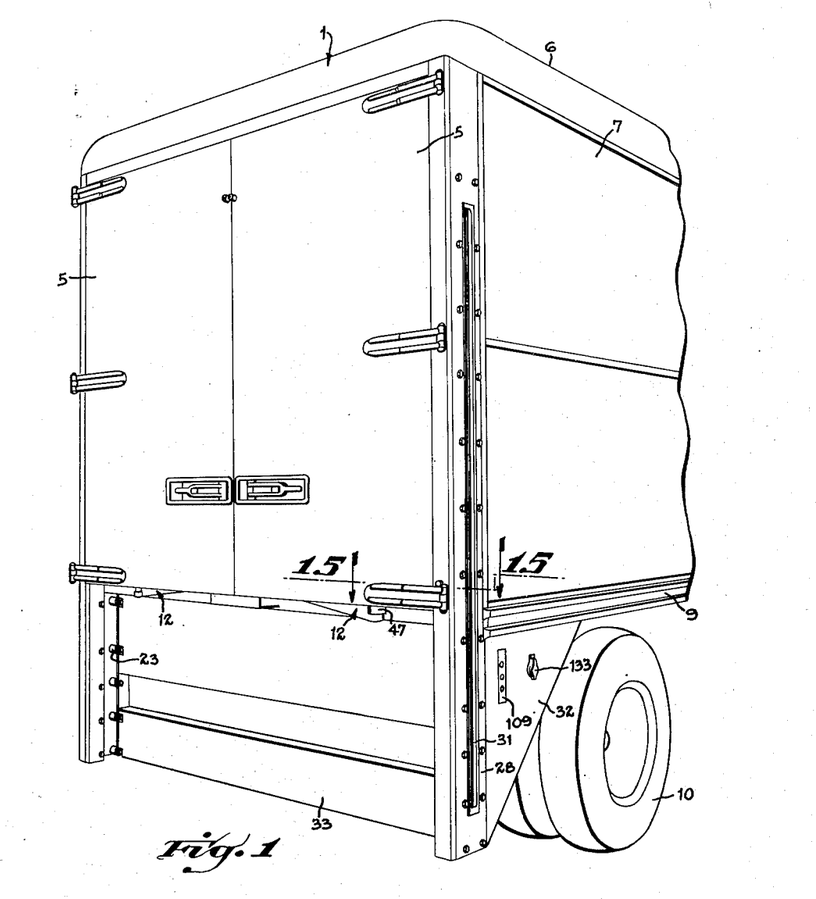
Figure 1 is a fragmentary perspective view illustrating the rear portion of a vehicle equipped with the improved apparatus with the doors in closed position.
Figures 5, 6, 7, 8, 9:
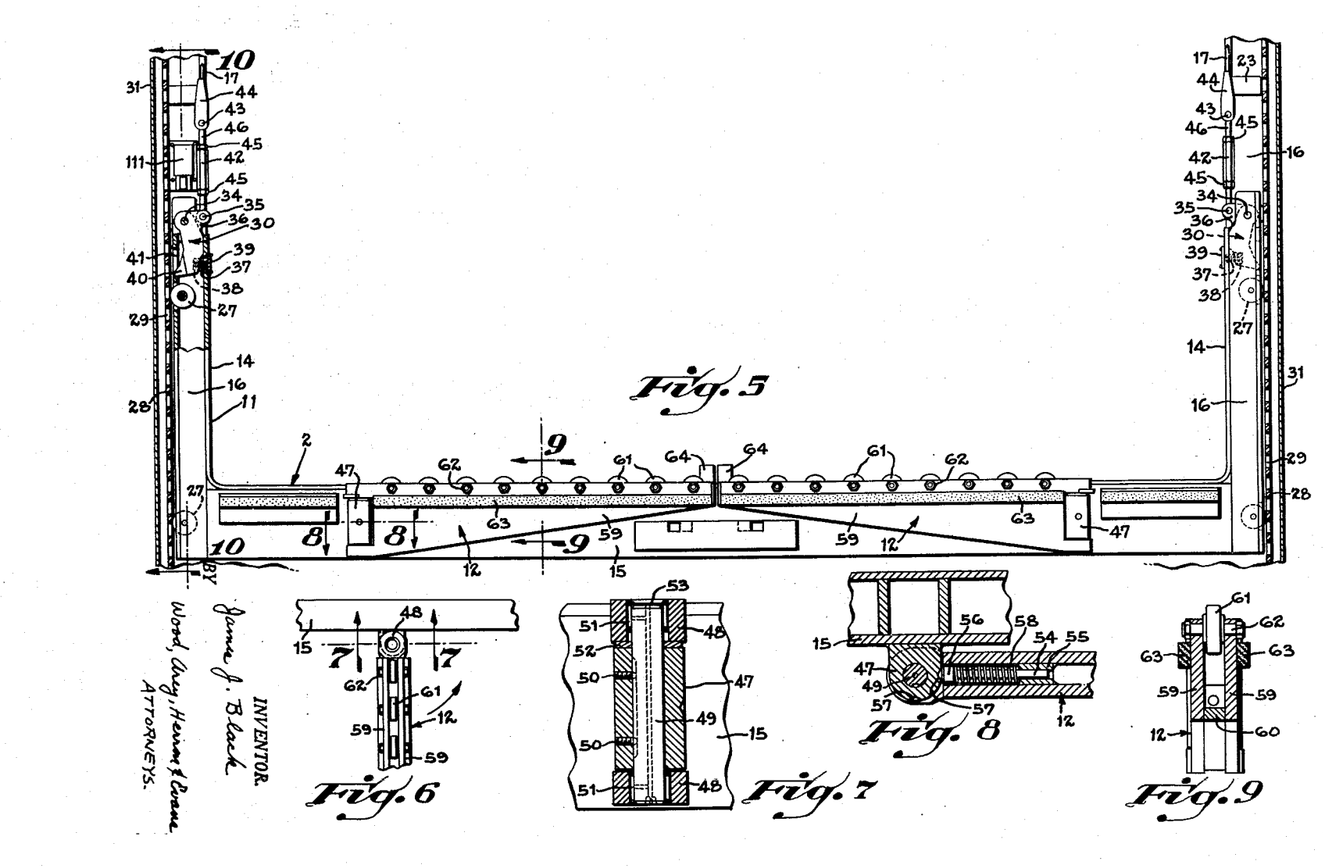
Figure 5 is a fragmentary sectional view taken on line 5—5, Figure 4, detailing certain parts and showing the elevator with the lift arms in folded position.
Figure 6 is a fragmentary top plan view projected from Figure 5, showing the lift arm in its extended position.
Figure 7 is an enlarged vertical section taken on line 7—7, Figure 6, detailing the hinge construction for the lift arm.
Figure 8 is an enlarged cross section taken on line 8—8, Figure 5, further detailing the detent arrangement for latching the arm in its selected position.
Figure 9 is an enlarged sectional view taken on line 9—9, Figure 5, detailing the lift arm and roller construction.

The elevator assembly 2 consists of a U-shaped frame 11 (Figure 5) having a pair of outriggers or lift arms 12—12 which are hingedly mounted to the frame. The arms are arranged to be extended rearwardly, as shown in Figure 2, during the loading and unloading operations and are folded to a flat position, as shown in Figures 1 and 5, when the doors 5 are closed. The frame 11 consists of a pair of vertical shoes 14—14 having their lower ends welded to a cross member 15. The respective shoes 14—14 are guided for vertical movement within the corner guide posts 16—16 of the trailer body and the assembly is suspended by a pair of cables 17—17 which is connected to the hoisting mechanism, generally indicated at 18 (Figure 20) as hereinafter described in detail.

Figure 4:
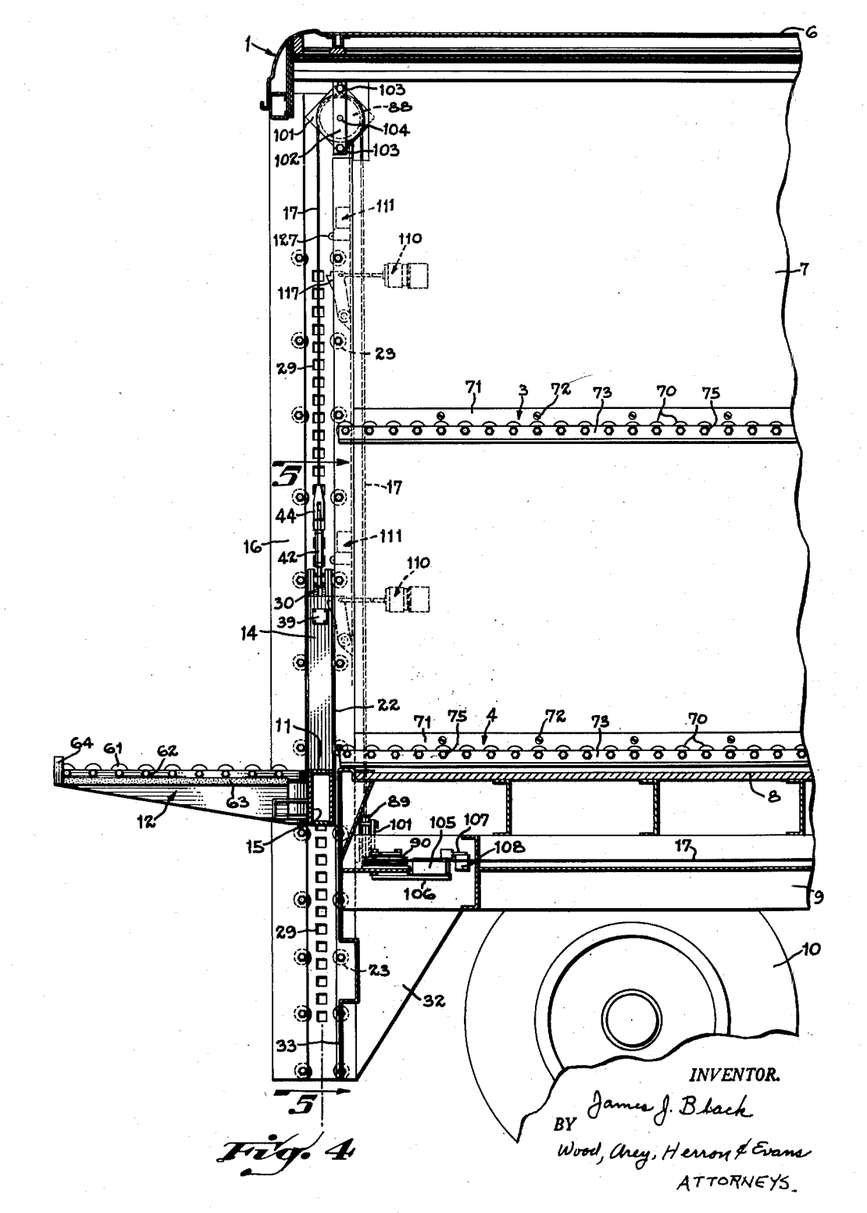
Figure 4 is an enlarged fragmentary sectional view taken on line 4—4, Figure 2, illustrating the general construction of the elevator assembly.
Figure 10:
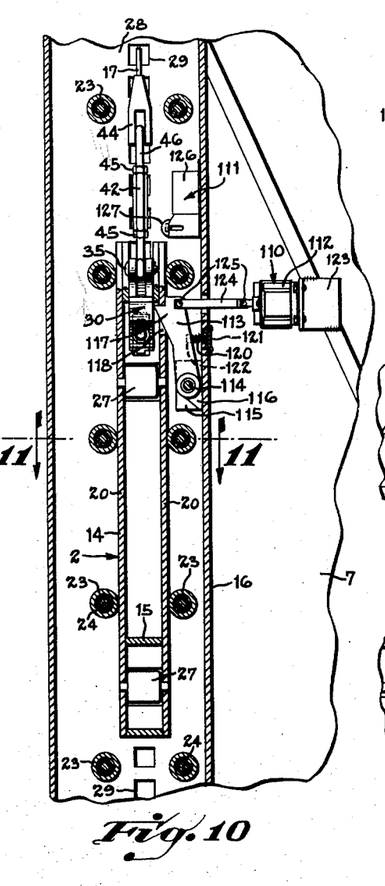
Figure 10 is a fragmentary vertical sectional view taken on line 10—10, Figure 5, illustrating the elevator frame, guide rollers and latching mechanism.
Figure 11:
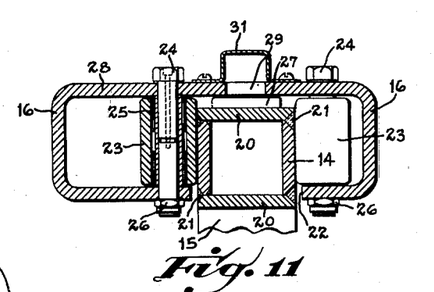
Figure 11 is an enlarged cross section taken on line 11—11, Figure 10, further detailing the guide post and rollers illustrated in Figure 10.

As illustrated in Figures 4, 10 and 11, the shoes 14 are square in cross section and are fabricated preferably from plates 20 welded together as at 21 and the cross member 15 is rectangular in cross section, as shown in Figure 4. The corner posts 16—16 within which the shoes are guided, preferably are in the form of hollow columns of rectangular cross section, each having a longitudinal opening 22 at its inner side of sufficient width to provide clearance for the shoe 14, which moves vertically within the column, as shown in Figure 11. The shoes are guided within the corner posts between pairs of rollers 23—23 which are journalled upon cross bolts 24 by means of anti-friction bearings 25. The bolts 24 extend through the side walls of the post 16 and are secured by nuts 26. As shown in Figure 10, the pairs of guide rollers are spaced to provide several bearing points at all times as the shoe moves through the column in order that the shoe may be adequately stabilized against the cantilever effect of the loaded lift arms 12.

Figure 19:
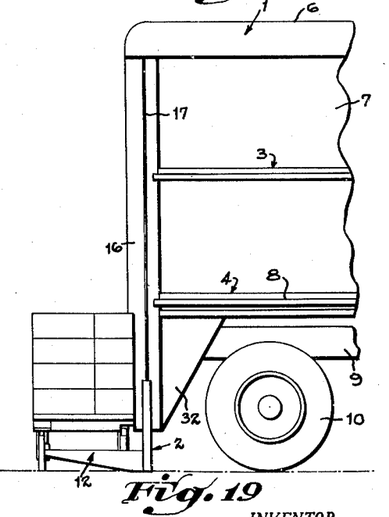

The elevator assembly is guided against lateral movement by a series of similar rollers 27 (Figures 5 and 11) journalled in the shoes and tracked against the outside wall 28 of the guide posts 16. The outside wall 28 of the respective guide posts are provided also with square openings 29 (Figures 10 and 11) which cooperate with safety catches indicated generally at 30—30 to prevent the elevator assembly from dropping if the cables 17—17 should break. As shown in Figure 11, the openings 29 are concealed by a channel shaped strip 31 having lateral flanges secured by screws to the post. In order that the elevator assembly may descend completely into contact with the ground, as shown in Figure 19, the guide posts 16 extend downwardly below the floor level 8. The depending ends of the posts are stiffened by means of the gusset plates 32 which extend angularly between the frame 9 and posts, and the posts are joined together by a transverse closure plate 33, Figures 2 and 4.

As shown in Figure 5, the safety catches 30 are interposed as connectors between the upper ends of the respective shoes 14 and cables 17—17 from which the shoes are suspended. Each safety catch is pivotally mounted at its upper end upon a pin 34 passing through the walls of the shoe 14 and the cable is attached to a pin 35 which is offset from pin 34 by a lug 36 formed at the upper end of the catch. The lower end of the catch is engaged by a compression spring 37 having one end seated in a recess 38 formed in the catch and having its opposite end seated upon a plate 39 which is secured by screws to the wall of the shoe. The outer end of the catch includes a spur 40 which is arranged to be snapped into engagement with one of the openings 29 by spring 37 to sustain the elevator if the cable 17 should break, a clearance opening 41 being formed in the wall of the shoe for this purpose. It will be observed that the catch is maintained in the retracted position shown by the tension of the cable with the lower portion of the catch seated against the shoe. In order to equalize cable tension and suspend the elevator assembly in a level position, an adjustable turnbuckle 42 is interposed between each safety catch and its cable. The lower end of the turnbuckle includes an eye connected to the catch pin 35 and the upper end includes a similar eye connected to a pin 43 passing through a cable connector 44. The turnbuckles are locked in adjusted position by means of nuts 45—45 screwthreaded upon the turnbuckle screws 46.

The outriggers or lift arms 12—12 are pivotally mounted upon the cross member 15 by means of the lugs 47—47 which are welded to the cross member 15 (Figures 5 to 8). The pivoted end of each outrigger is bifurcated to provide limbs 48—48 which straddle the lug and a pivot pin 49 passes through the arm and is secured in the lug by set screws 50—50. Anti-friction bearings 51—51 are interposed between the pivot pin and limbs, as shown in Figure 7, a washer 52 is placed at the top of the lug, and the bearing includes a closure cap 53 for protection against dirt and moisture.

In order to latch the outriggers in their folded and extended positions respectively, a detent plunger 54 is located within each outrigger adjacent its supporting lug 47. The plunger 54 is slidably supported by a bearing 55 and the outer end of the plunger includes a head 56 shaped to engage the detent notches 57—57 formed in the lug. A spring 58 is maintained in compression between head 56 and the rear shoulder of bearing 55 to urge the plunger into engagement with the notches. The notches are located in positions to latch the outriggers either in folded position, as shown in Figure 8, or in extended position, as shown in Figure 6.

Figure 17:
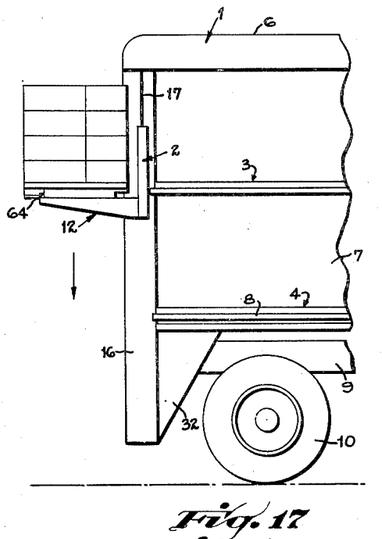

The outrigger arms 12—12 each consist of a pair of elongated wedge shaped side plates 59—59 joined across their lower edges by a spacer plate 60 which is welded to the side plates (Figure 9). The upper surface of each arm is provided with a series of anti-friction rollers 61 journalled upon bolts 62 passing through the plates 59—59, the rollers being cradled between the side plates and disposed slightly above the upper edge of the arms to track the pallets, as hereinafter disclosed. The opposite sides of each outrigger arm include strips 63—63, formed preferably from foam rubber and arranged to provide dust and weather seals and to cushion the doors with respect to the limbs when limbs are folded against cross member 15 with the doors closed. The outer ends of the outrigger arms further include a stop element or lug 64 arranged to engage the pallet to prevent it from rolling off the arms, as shown in Figure 17. At the lower limit of travel, the arms and their lugs are clear of the bottom of the pallet to permit the pallet to be wheeled away as shown in Figure 19.

Figure 14:
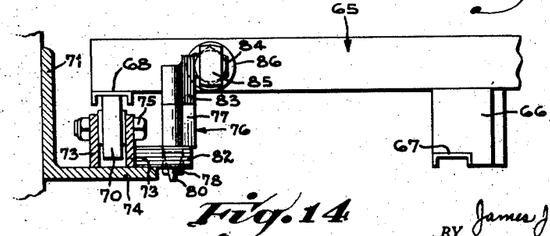
Figure 14 is a sectional view taken on line 14—14, Figure 3, showing the end portion of a pallet resting upon the pallet rail, with the clamping device in clamping position against the pallet.

Referring to Figure 14, an end portion of a pallet is indicated generally at 65, the pallet consisting essentially of a rectangular platform adapted to extend crosswise approximately for the full width of the trailer body and having two sets of tracks, one set for tracking upon the lift arms 12—12 and the other set for tracking upon the sets of vehicle pallet rails 3 and 4. The tracks 66 for the lift arms are spaced inwardly from the ends of the platform in registry with the arms, and the lower surface of each rail is provided with a channel 67 arranged to track upon the rollers 61 of the arms. The outer ends of the pallets are provided with similar channels 68 adapted to track upon the rollers 70 of the upper and lower pallet rails 3 and 4 (Figure 4).

Each pallet rail consists of an angle iron 71 secured preferably by means of screws 72 to the side wall 7 of the trailer body which is suitably reinforced for this purpose. The angle irons extend for the full length of the body and each includes a pair of spaced bars 73—73 secured by welding to the inward flange 74 of the angle iron. The rollers 70 are mounted between these bars upon bolts 75 which extend through the bars, following generally the construction of the outrigger arms 12. The control system for the elevator assembly is arranged automatically to level the outrigger arms selectively with respect to either set of pallet rails, with the outriggers slightly below the pallet rails, as determined by the thickness of the transverse rail 66 of the pallets, as indicated in Figure 4. In this position, the pallets can be shifted smoothly between the outrigger arms and pallet rails, both sets of pallet tracks being in alignment with their respective outrigger and pallet rails.

Figure 12:
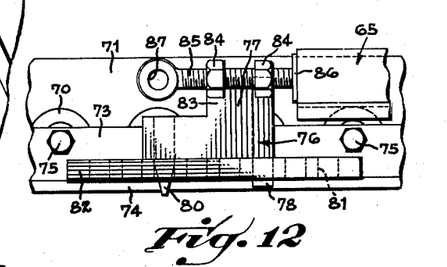
Figure 12 is an enlarged fragmentary view of one of the pallet clamping devices shown in Figure 3.
Figure 13:
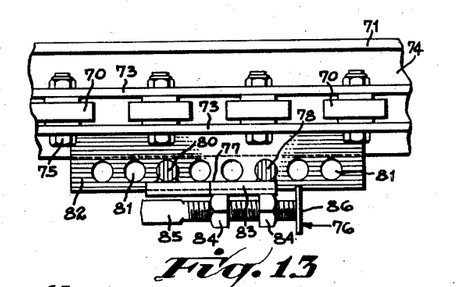
Figure 13 is a top plan view of the clamping device as projected from Figure 12.

As noted previously, the apparatus is intended to permit the vehicle to be loaded by transferring loaded pallets directly from rails at the loading dock which match with the pallet rails without using the elevator. For this purpose, the vehicle is backed in position against the dock with the dock rails abutting the vehicle pallet rails and with the outrigger arms folded in their inoperative position. However, the apparatus is not limited to such operation; instead may be loaded from the ground level by using the elevator to raise the pallets to the pallet rails. In either loading practice, the pallets are shifted upon their rails successively from the rearward to the forward end, if necessary in prearranged order, and the loaded pallets are clamped collectively in position upon the rails by pairs of clamping devices, indicated generally at 76 in Figures 3, 12 and 13, there being provided one pair for each level.

Figure 3:
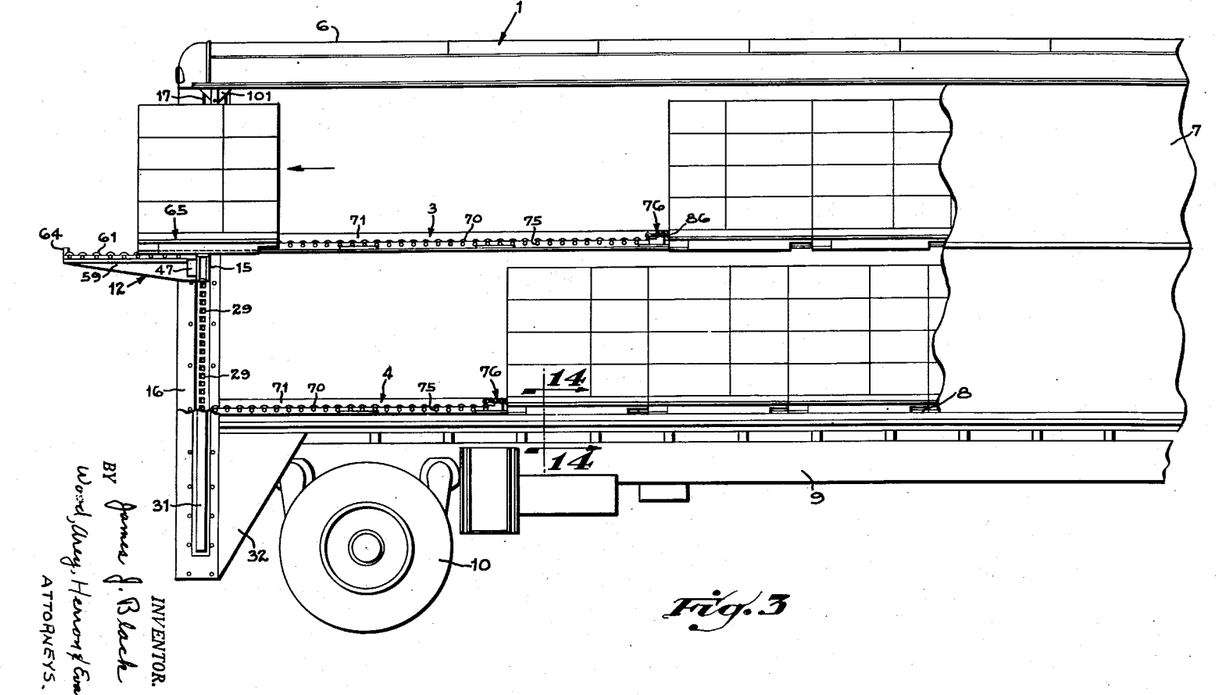
Figure 3 is a fragmentary side elevation partially broken away, illustrating generally the apparatus in its operating relationship with the load support rails of the vehicle.

Each clamping device consists of a vertical plate 77 having a pair of pins 78 and 80 welded to one side and projecting downwardly beyond the lower edge of the plate adapted to engage selected apertures 81 formed in a horizontal mounting plate 82 which is welded to the angle iron flange 74. The upper edge of plate 77 forms a lug 83 to which is welded a pair of nuts 84—84. An eye bolt 85 is screwthreaded through the nuts 84 and a clamping disk 86 is welded upon the end of the eye bolt to engage the edge of the pallet. In loading the body, the clamping devices are removed to permit translation of the pallets over the rails and after the pallets are loaded, a pair of clamping devices is placed behind the last pallet of each level with the pins engaged in the mounting plate holes. The eye bolts then are tightened into clamping engagement with the pallet by inserting a bar through the aperture 87 of the bolt, thus forcing the pallets forwardly into clamping engagement with one another, as shown in Figure 3, so that all of the pallets are securely anchored in position during transit. Before unloading, the clamping devices are removed to permit the pallets to be shifted rearwardly to the elevator. If only a part of the pallets are unloaded at a given stop, those remaining in the trailer are clamped by replacing the clamping devices in the forwardly disposed clamping plates 82, as shown in Figure 3, there being provided a set of clamping plates for each pallet.

*Hoisting apparatus*

Figure 20:
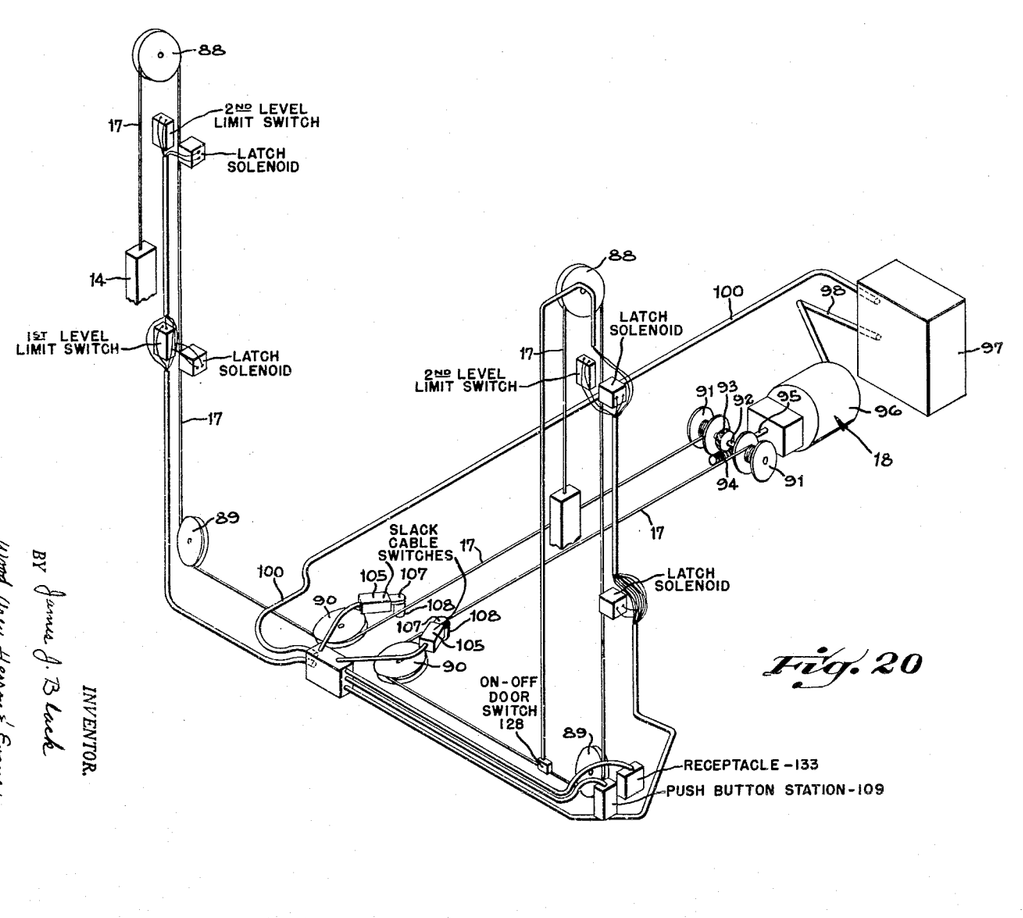
Figure 20 is a diagrammatic perspective view illustrating the driving apparatus and associated electrical components of the apparatus.

As previously noted, the elevator assembly is raised and lowered by the cables 17—17 which extend to the electrical hoisting unit 18 which is mounted upon the vehicle frame or chassis. The general arrangement of the apparatus is best illustrated in Figure 20 which illustrates diagrammatically the cable system, the hoisting unit and the various electrical control devices associated mechanically with the elevator and in electrical connection with the control circuit for regulating automatically the movements of the elevator. The control circuit is described in greater detail in connection with the electrical circuit diagrams of Figures 21 and 22. As shown in Figures 4 and 20, the cables 17—17 pass upwardly over a pair of idler sheaves 88—88 which are mounted near the top of the trailer body upon the guide posts 16. Each cable passes downwardly from idler sheave 88 to a similar sheave 89 mounted upon the frame and related at right angles to sheave 88. From sheave 89 the cable passes around a sheave 90 mounted upon a vertical axis of rotation and passes rearwardly to the winding drums 91—91 forming a part of the hoisting unit 18. As shown in Figure 20, the drums 91 are mounted upon a common shaft 92 which includes a worm wheel 93 driven by a worm 94 mounted upon the shaft 95 of hoist motor 96. This motor is a conventional reversible motor equipped with an electrical brake and its operation is regulated automatically by the control circuit illustrated in Figure 21. The hoisting unit is mounted upon the vehicle frame 9 and, since the unit is of standard construction, a detailed disclosure of the unit and its mounting arrangement has been omitted. It is to be noted at this point that the drum limit switches indicated in the control circuit diagram are associated with the hoisting unit. These switches (not otherwise shown) are conventional final limit switches and are normally closed; they open only when the drums rotate beyond the normal operating range.

The electrical components of the control circuit with the exception of those parts associated with the elevator assembly, are mounted within the control box 97 adjacent the motor. This unit likewise is secured upon the vehicle frame, preferably adjacent the motor, and the control wires for operating the motor are enclosed in a cable 98 extending from the control box to the motor. The various control wires connecting the control circuit with the several limit switches and solenoids associated with the elevator assembly are included in a cable 100 extending from the electrical parts to the control circuit.

The idler sheaves 88, 89 and 90 are rotatably mounted upon brackets each consisting essentially of a base plate 101 which is secured to the trailer body, as shown in Figure 4. Each sheave is mounted for rotation between the plate 101 and a bar 102 secured to the base plate by spacer bolts 103. The sheave is journalled upon a shaft 104 which extends through the plate and bar 102.

Each horizontal sheave 90 includes a slack line switch 105 which is actuated by the cables to open an electrical circuit when the cables are slack and to close the circuit when the cables are taut, being generally similar to the limit switches of the swinging arm type used, for example, in the control of elevators. As shown in Figure 4, the slack line switch 105 is mounted upon a plate 106 adjacent the sheave 90 and the switch is provided with an arm 107 carrying a roller 108 at its swinging end, the roller being engaged against the cable 17. The arm 107 is spring loaded to urge the roller 108 against the cable and the switch includes electrical contacts which open to deenergize the circuit when the switch arms are swung beyond the position maintained by the taut cable. The slack line switches are interconnected with the electrical control circuit to deenergize the hoist motor when the elevator is at rest, either upon the ground or upon the solenoid operated latches at the first and second levels as hereinafter described.

*Operation*

Figure 18:
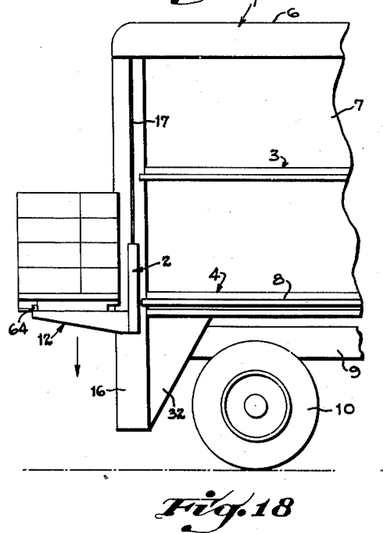

The operation of the elevator is best illustrated diagrammatically in Figures 16 to 19 and is controlled by push buttons which are grouped at the push button station at the rear end of the trailer as indicated at 109 in Figures 1 and 2. These buttons are designated in the diagram of Figure 21 as "ground level," "first level" and "second level." When the second level button is depressed, the control circuit will be conditioned to move the elevator to the upper pair of pallet rails where it stops automatically in alignment with the rails for loading, as shown in Figure 17. After loading, the ground level button is depressed to cause the elevator to descend until it rests upon the ground, as shown in Figure 19, where it will remain stationary until one of the upper level buttons is again depressed. Thus, as shown in Figure 18, the first level button has been depressed to bring the elevator to the lower pallet rails for loading, from which point it will be again brought to the ground.

The elevator is levelled accurately in alignment with the pallet rails by pairs of solenoid operated latches, indicated generally at 110 (Figures 4 and 10) which are arranged to sustain the elevator independently of the cables so that the registration is not affected adversely by cable stretch. In operation, the elevator rises slightly above the latch then descends until the weight load is transferred from the cables to the latches, the hoist motor being deenergized automatically when the cables become slack by the slack line switches 105—105, as later described with reference to the control circuit. Since the present structure provides two pallet rail levels, there is provided a pair of latches for each level, the latches of the pairs being mounted upon the guide posts 16 so as to support both ends of the elevator.

Above each latch as shown in Figures 4, 5 and 10, there is mounted a limit switch 111 which is interconnected with the control circuit to cause the hoist motor to reverse its direction when the limit switch is tripped by the elevator in its upward travel. Thus, for example, if the second level button is depressed with the elevator at a lower level, the elevator will ascend, depress the latch arm in passing and continue until its upper end trips the limit switch; the elevator will then descend until it is engaged mechanically by the latches and will remain in this position until the ground level switch is depressed. When this occurs, the elevator will again ascend sufficiently to depress the limit switch before it starts its descent. As the elevator is lifted from the latches, the latch solenoids 112 are energized to retract the latches, and after a momentary delay, the elevator begins its descent and continues until it reaches ground level. The purpose of raising the elevator before lowering it is to disengage it from the latches 110 and thus permit them to be retracted; also, it will be noted that both the upper and lower latches are retracted since the elevator must pass both pairs of latches in order to reach the ground.

Described in detail, the latch assemblies 110 each consist of an arm 113 having its lower end pivoted as at 114 upon a pair of blocks 115 preferably welded to the interior of the guide post 16. The lower end of the arm includes a downwardly extended lug 116 arranged to engage the post to maintain the arm normally in the position shown in Figure 10. The upper or swinging end of the latch includes an inclined portion 117 which forms a shoulder adapted to engage the hole 118 formed in the upper end of the elevator shoe 14. The latch is urged outwardly by a compression spring 120 having its outer end seated against a plate 121 and its inner end engaged in a recess 122 formed in the arm. By this arrangement, the latch is retracted automatically by the elevator shoe when the shoe engages the inclined portion in the upward direction and locks the shoe against downward movement. The latch arm 113 is retracted by the solenoid 112 which is mounted upon a bracket 123 secured to the trailer frame. The solenoid armature is connected to the arm by a link 124 having its opposite ends pivotally connected to the upper end of the latch arm and armature as at 125—125. When the elevator is lowered upon the solenoid latches 113 and the cables become slack, the cable safety catches 30 are released. Thus, they perform their safety function either if the cables should break or if the solenoid latches should fail. If desired, the parts may be arranged so that the catches 30 align with and enter their openings 29 when the elevator rests upon the solenoid latches for positive engagement at the loading levels.

Figure 15:
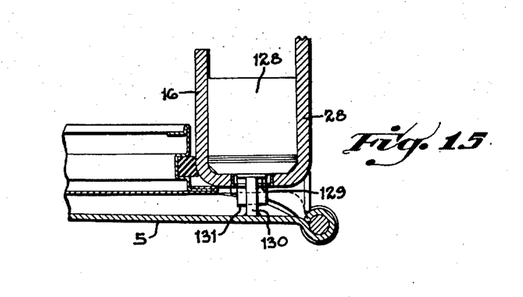
Figure 15 is a sectional view taken on line 15—15, Figure 1, detailing the door hinge and its associated safety switch.
Figure 16:
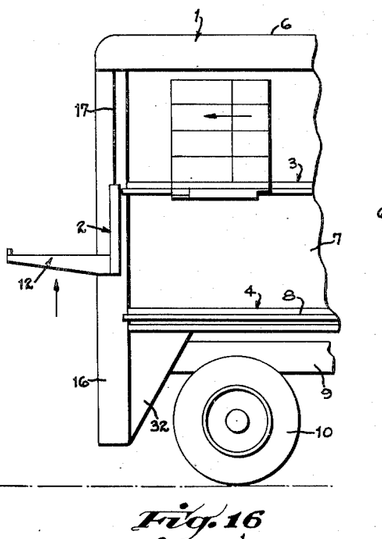
Figures 16 to 19 inclusive are diagrammatic side views illustrating the several operations of the lift apparatus in unloading the vehicle.

The limit switches 111 follow a conventional design and are not disclosed in detail. Each switch unit consists of a housing 126 enclosing the electrical components, with a depressible roller 127 arranged to open the switch upon depression of the roller by the elevator shoe with which it is aligned. As shown in Figure 4, the switches are mounted within the post 16 directly above the latches 113 with their rollers in position to be depressed by the upper end of the elevator shoe. In the present instance, there is provided a pair of limit switches at the second level and a single switch at the first level; however, a single switch at each level is sufficient if the circuit is so arranged. In order to prevent operation of the elevator when the doors 5—5 are closed, there is provided a door operated safety switch 128 (Figures 2 and 15) which opens the control circuit automatically when the doors are closed. This switch is of the two button snap type, having an "off" button 129 which is engaged, as shown, by a stud 130 secured to the door, and an "on" button 131 which is depressed manually to close the circuit when the doors are open and the elevator ready for operation. The switch casing is secured within the guide post 16 which is provided with apertures to expose the buttons, as shown in Figure 2.

*Control circuit*

Figure 21:
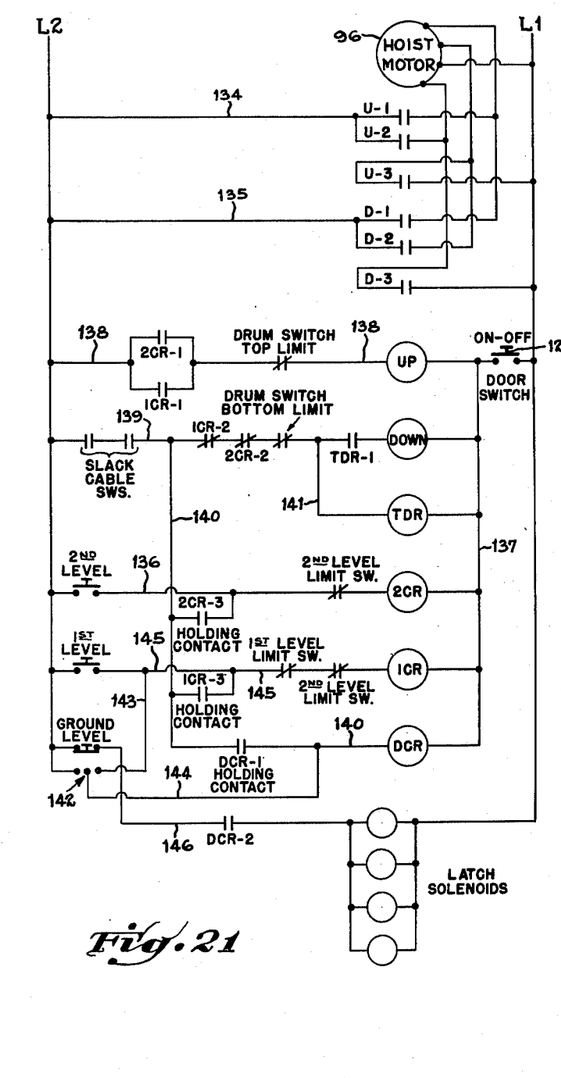
Figure 21 is an electrical diagram of the control system.
Figure 22:
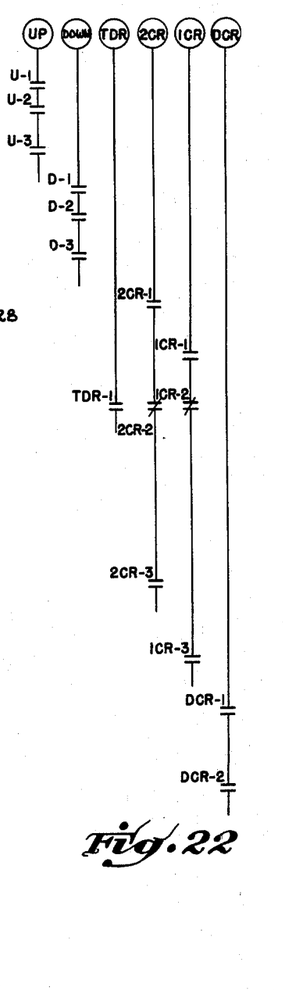
Figure 22 is a diagram taken in conjunction with Figure 21 to identify the contacts actuated by each relay winding.

Power for operating the hoist motor 96 and its control circuit is conducted from a standard A. C. service outlet by the extension cord 132 to the trailer receptacle 133 as shown in Figure 2 and conducted to the power lines L1 and L2 of the control circuit (Figure 21). The hoist motor consists of a standard reversible motor equipped with electric brakes and the motor circuit itself is omitted from the disclosure since it may follow any standard practice. The motor is energized respectively for up or down elevator movement by the branch power lines 134 and 135 which connect the power line L2 to the contacts of the reversing relays, the windings of these relays are labelled "up" and "down" respectively in the diagram. The various other components of the circuit also are labelled according to their function for convenience in tracing the circuit. The contacts of the several relays are placed directly in the lines which they energize instead of being shown in conjunction with the relay coils which actuate them; and in order to correlate the contacts with the respective relays which actuate them, the contacts are shown in Figure 22 with lines connecting them to their actuating relays, the various contacts being placed in horizontal alignment with the position they occupy in Figure 21 for convenient reference.

As previously noted, the trailer door must be in open position in order to close the door operated switch which energizes the control circuit. As above noted, this switch 128 includes two buttons which are depressed alternately to open and close the circuit, the "off" button being depressed by the trailer door so that it is necessary to depress the "on" button manually to place the circuit in operation. This permits the circuit to be deenergized manually by pressing the "off" button should it become necessary while the elevator is operating. The drum switches shown in the diagram are associated with the hoisting unit, as previously noted, and remain normally closed unless the apparatus overruns its operating range by failure of the control circuit. These switches, therefore, take no active part in normal control of the elevator and may be disregarded in analyzing the control circuit.

The control system is best disclosed by following the sequence of operations in the various cycles of movement executed by the elevator when the push buttons are depressed. As above noted, when the elevator is stationary it rests either upon the ground or upon the latches 113 with the slack cable switches in open position as shown in the diagram. Assuming that the second level button is depressed, a circuit is established from line L2 to line 136 through the normally closed second level limit switch, through the winding of relay 2CR to line 137 and through the closed on-off door switch to L1, thus, energizing relay 2CR. Energizing this relay closes the normally open contact 2CR—1 to establish a circuit from L2 through line 138 to the winding of the Up relay, the circuit being completed from the Up relay winding to line L—1 through the door switch, as previously noted. Since relay 2CR is energized, its normally closed contact 2CR—2 in line 139 is now open to prevent the Down relay from being energized when the slack cable switches close. When the Up relay is energized, the contacts U—1, U—2, and U—3 are closed to establish a circuit from L2, line 134 to the hoist motor to L1 to release the motor brake and drive the motor in the Up direction. As the hoist cables become taut, they close the slack cable switches in line 139 to establish a holding circuit from line L—2, through the slack cable switches to branch line 140, through the holding contact 2CR—3 through relay 2CR to line 137. This circuit maintains contact 2CR—1 in closed position after the second level button is released, causing the motor to continue running in the Up direction until the elevator contacts the second level limit switch in line 136 to deenergize relay winding 2CR.

When this occurs, the elevator is slightly above the upper latches 113, as previously noted, so that the latch arms may engage the elevator when it is lowered upon them. Also, when winding 2CR is deenergized, its holding contact 2CR—3 is opened and its normally closed contact 2CR—2 in line 139 is permitted to close. The closing of contact 2CR—2 establishes a circuit from line L—2 through the slack cable switches which are now closed, through the normally closed contacts 1CR—2, 2CR—2, drum limit switch, to line 141 and through the winding of relay TDR to line 137. Relay TDR is a delayed action relay which, upon being energized, hesitates momentarily, then closes its contacts TDR—1 to energize the Down relay. Its purpose is to provide a time lag to permit the motor to be stopped before it is reversed to lower the elevator. Upon being energized, the Down relay closes contacts D—1, D—2 and D—3 to drive the hoist motor in the Down direction, causing the elevator to be lowered until it is engaged by the latch arms. Continued Down rotation of the motor after the elevator is stopped will slacken the cables and open the slack cable switches in line 139 to deenergize both the Down relay and relay TDR, causing them to open their contacts and stop the motor. The elevator is now in alignment with the upper pallet rails, resting upon the latch arms in position for loading with the cables slack and the circuit contacts in their original position, as shown in the diagram.

In order to lower the elevator, it is necessary first to raise it from the solenoid latches so that they may be retracted; therefore, the elevator must start in the Up direction and then reverse after the latches are retracted. When the ground level button is depressed to lower the elevator, a circuit is established from L2 through the three push button contacts 142, to lines 143 and 144 through relays 1CR and DCR to line 137. As shown, line 143 connects to line 145, the circuit being established through the closed first and second level limit switches, through winding ICR to line 137. Line 144 branches to line 140 and thus energizes winding DCR. It will be noted at this point that relay DCR includes a holding contact DCR—1 in line 140 and a second contact DCR—2 in line 146 which completes a circuit to the latch solenoids after the ground level switch is released and the slack cable switches close, as hereinafter described. When relay ICR is energized, it closes the contact ICR—1 in line 138 to energize the Up relay thus closing the Up contacts U-1, U-2 and U-3 to start the motor in the Up direction and to close the slack cable switches to provide a holding circuit through line 140 and through contacts DCR—1. The ground level switch is depressed momentarily to start this operation and returns to the position shown in the diagram when released so that a circuit is reestablished from L-2 through the normally closed contacts of the ground level switch, through line 146 and closed contacts DCR—2 to energize the latch solenoids and retract the latches, the latch arms 113 being relieved of weight of the elevator.

The elevator continues in the Up direction until it encounters and opens the second level limit switch in line 145 to deenergize relay ICR, opening the contact ICR—1 in line 138 to deenergize the Up relay and stop the motor. The second level limit switch in line 136 also is opened but has no function in this operation since the second level push button switch is open. Since the slack cable switches in line 139 are closed, a circuit is established from L-2, line 139 through the normally closed contacts ICR—2 and 2CR—2 (relays ICR and 2CR being deenergized), through normally closed drum switch, and through line 141 to energize the time delay relay TDR. After a momentary delay, contact TDR—1 in line 139 closes to compelte the circuit through the Down relay, closing contacts D-1, D-2 and D-3. The hoist motor then operates in the Down direction with the latches retracted until the elevator rests upon the ground, causing the cables to slacken and thus opening the slack cable switches in line 139. When this occurs, the Down relay and relay TDR are deenergized, opening the motor contacts to bring the motor to a stop. The relay DCR also is deenergized by the slack cable switches to open its contacts and DCR—1 and DCR—2 to deenergize the latch solenoids and permit the latch arms to spring to latching position. The elevator will now remain at rest upon the ground with the contacts conditioned as shown in the diagram until the first or second level push button is again depressed.

When the first level button is depressed, a circuit is established from line L2 through line 145, through the closed first and second level limit switches, through the relay ICR to line 137. When the relay ICR is energized, contact ICR—1 in line 138 is closed to energize the winding of the Up relay and start the motor in the Up direction. As the motor takes up the slack in the cables, the slack cable switches in line 139 are closed to establish a holding circuit for relay ICR from line 140 through holding contacts ICR—3, to line 145, through the closed limit switches, through relay ICR to line 137. It is to be noted also that the normally closed contact ICR—2 in line 139 is now open (ICR being energized) to prevent the Down relay from being energized. The circuit for the Up relay thus is maintained by the holding contact ICR—3 after the first level button is released, and the motor will continue running until the elevator encounters the first level limit switch in line 145. At this point the elevator is slightly above the first level latch arms to be lowered into engagement with them, as previously described, so as to position the elevator in alignment with the first level pallet rails.

When the first level limit switch is opened by the elevator, it deenergizes the winding ICR, opening the holding contact ICR—3, and opening contact ICR—1 in line 138 to deenergize the Up relay and stop the motor. When relay ICR is deenergized, it also closes the normally closed contact ICR—2 in line 139; and since the slack cable switches also are now closed, a circuit is established from L-2, through the slack cable switches, through closed contacts ICR—2, 2CR—2, (relay 2CR being deenergized), through the drum limit switch, through line 141 to energize the winding of the time delay relay TDR. After a pause, contact TDR—1 of this relay closes to energize the Down relay, causing the elevator to move in the Down direction until it is arrested by the latch arms. The slack cable switches now open to deenergize the Down relay and relay TDR and contacts again assume the position shown in the diagram with the elevator at rest at the first level.

To bring the elevator from the first level to the ground, the ground level button is depressed, closing the contacts 142 to energize relays ICR and DCR through the lines 143 and 144. Relay ICR closes contact ICR—1 in line 138 to start the motor in the Up direction and relay DCR closes contacts DCR—2 in line 146, eventually to retract the latch arms. As soon as the elevator opens the first level limit switch in line 145, relay ICR is deenergized to open contact ICR—1 and stop the motor. In the meantime, the slack cable switches have been closed to energize the winding of relay TDR which closes contact TDR—1 in line 139 to energize the Down relay and after a short delay, to start the motor in the Down direction.

As above noted, the latch arms cannot be retracted while the elevator is resting upon them; therefore, the circuit is arranged to energize the latch solenoids only after the elevator is suspended by its cables. For this purpose, the ground level switch is provided with normally closed contacts in line 146 but the normally open contacts DCR—2 in the line prevents the solenoids from being energized. Thus, when the ground level switch is depressed, its normally closed contacts are opened, and alternately the contacts DCR—2 are closed by relay DCR but the normally closed button contacts are opened so that the solenoids remain inactive until the motor takes up the cable slack and closes the slack cable switches. This establishes a holding circuit through line 140, through holding contacts DCR—1 which are now closed, to relay DCR, permitting the ground level button to be released. Upon release of the button, the circuit to the solenoids is completed through the button contacts, and through contacts DCR—2 to energize the solenoids. The solenoids remain energized until the elevator reaches the ground to open the slack cable switches and deenergize relay DCR. The latch solenoids are energized in the same manner whether the elevator is brought down from first or second levels because the circuit is established in both instances through the slack cable switches.

Having described my invention, I claim:
1. In an elevator adapted to be applied to a vehicle to travel between the ground level and the vehicle level, power means connected to the elevator for raising and lowering the elevator with respect to the ground level and vehicle level, an electrical control system including manually operated selector switches for regulating the power means, a movable latch arm associated with the vehicle and adapted to be engaged by the elevator and moved to a retracted position during upward movement of the elevator, the latch arm being arranged to move to an extended latching position after movement of the elevator above the latch arm to support the elevator against downward movement at the vehicle level, and means interconnected with the elevator control system for raising the elevator above the latch arm and automatically lowering the elevator into engagement with the latch arm.

2. In an elevator adapted to be applied to a vehicle to travel between the ground level and a vehicle level, power means connected to the elevator for raising and lowering the elevator, a control system including manually operated means for regulating the power means, a latching device operable to latch the elevator automatically at the vehicle level, automatic means for raising the elevator out of engagement with the latching device prior to lowering the elevator, when the control system is conditioned for lowering the elevator, means for retracting the latching device when the elevator is raised, means in the control system for lowering the elevator to the ground level, and automatic means associated with the elevator to deenergize the power unit when the elevator is lowered into supporting engagement with the ground level.

3. In an elevator adapted to travel relative to a vehicle between the ground level and vehicle level, elevator guide means, power means connected to the elevator for raising and lowering the elevator with respect to the ground level and upper level, an electrical control system including manually operated selector switches for regulating the power means, a movable latch arm associated with the elevator guide means and adapted to be engaged by the elevator and moved to a retracted position during upward elevator movement, the latch arm being arranged to move to an extended latching position after movement of the elevator above the latch arm to latch the elevator against downward movement, means interconnected with the elevator control system adapted to raise the elevator above the latching device and to lower the elevator automatically into engagement with the latching device when the control system is conditioned for raising the elevator, and automatic means interconnected with the electrical control system for deenergizing the power unit when the elevator is supported upon the latching device.

4. In a vehicle having a load sustaining level, an elevator adapted to travel between the ground level and said load sustaining level, elevator guide means, power means connected to the elevator for raising and lowering the elevator with respect to the ground level and load sustaining level, an electrical control system including manually operated selector switches for regulating the power means, a latching device associated with the elevator guide means and adapted to retract during upward elevator movement and to latch the elevator against downward movement at the load sustaining level, means interconnected with the elevator control system for raising the elevator above the latching device and automatically lowering the elevator into engagement with the latching device when the control system is conditioned to raise the elevator, automatic means interconnected with the electrical control system for deenergizing the power unit when the elevator is supported upon the latching mechanism, and automatic means interconnected with the control system for raising the elevator out of engagement with the latching device prior to lowering the elevator when the control system is conditioned to lower the elevator and for retracting the latching device when the elevator is raised out of engagement therewith, whereby the elevator may be lowered to ground level.

5. In a vehicle having a load sustaining level, an elevator adapted to travel between the ground level and the load sustaining level, elevator guide means, an electrically operated power unit connected to the elevator for raising and lowering the elevator with respect to the said ground level and load sustaining level, an electrical control system including manually operated switches for regulating said power unit, a latching device associated with the guide means constructed and arranged to latch the elevator automatically at the said load sustaining level, means in the electrical control system for raising the elevator out of engagement with the latching device prior to lowering the elevator when the control system is conditioned to lower the elevator to the ground level, an electrically operated device connected to the latching device and in electrical connection with the control system operable to retract the latching device when the elevator is lifted from the latching device, and means in the control system for lowering the elevator to the ground level after the latching device is released and for deenergizing the power unit when the elevator is lowered into supporting engagement upon the ground level.

6. An elevator adapted to be applied to a vehicle to travel between the ground level and a vehicle level comprising, elevator guide means, power means including cables connected to the elevator, an electrical control system including manually operated selector switches for regulating the power means, a latching mechanism having electrically operated releasing means connected to the control system, the latching mechanism being associated with the guide means and constructed and arranged automatically to latch the elevator at the vehicle level, slack cable switches connected to the control system and associated with the said cables, the slack cable switches being constructed and arranged to regulate the control system in response to cable tension, limit switches connected to the control system and disposed in positions to be actuated by the elevator when the elevator rises above its latching position, the control system being arranged to raise the elevator into engagement with the latching mechanism when one of its selector switches is actuated to condition the control system for raising the elevator, the said slack cable switches being operable to deenergize the power unit either when the elevator is supported by the latch mechanism or upon the ground level.

7. In an elevator system, an elevator, elevator guide means, a power unit including a control system for regulating the movements of the elevator, the control system including manually actuated selector switches adapted to move the elevator automatically to a selected level, cables connecting the power unit to the said elevator for raising and lowering the same, latching means associated with the guide means and arranged to support the elevator at the selected level, and slack cable switches associated with the cables and connected to the control system, said switches being responsive to cable tension to deenergize the power unit when the weight of the elevator is transferred from the cables to the latching means.

8. In an elevator system, an elevator, elevator guide means, a power unit including a control system for regulating the movements of the elevator, the control system including manually actuated selector switches adapted to move the elevator automatically to a selected level, cables connecting the power unit to the said elevator for raising and lowering the same, latching devices arranged to support the elevator at the selected level, the latching devices being yieldably mounted upon the elevator guide means and adapted to be retracted by the elevator during upward travel thereof, slack cable switches associated with the cables and connected to the control system, said switches being responsive to cable tension to deenergize the power unit when the weight of the elevator is transferred from the cables to the latching devices, and electrically operated devices associated with the latching means and connected to the control system operable to retract the latching devices during downward travel of the elevator.

9. In an elevator system, elevator guide means, an electrically operated power unit, an elevator, cables connecting the power unit to the elevator, an electrical control system including selector buttons for moving the elevator to selected levels, respective limit switches connected to the control system and associated with the guide means at selected levels, the limit switches being constructed and arranged to be actuated by the elevator during its upward movement, and the control system being arranged to reverse the direction of elevator travel upon actuation of the limit switches, electrically retracted automatic latching devices associated with the guide means at the respective levels in position to engage and support the elevator when it is lowered upon them, a tension responsive switch associated with the cables and connected to the control circuit, the said switch being constructed and arranged to cause the control system to deenergize the power unit when the elevator is supported by the latches, means in the control circuit for raising the elevator out of engagement with the latches prior to lowering the same when the control system is conditioned to lower the elevator, the circuit being arranged to energize the latching devices to retract the latches when the tension responsive switch is actuated in raising the elevator, whereby the latch mechanisms are retracted to disengaging position prior to the descent of the elevator.

10. In a vehicle having a plurality of load sustaining levels, an elevator movably mounted upon the vehicle and adapted to move selectively into alignment with the load sustaining levels and the ground level, an electrical hoisting unit having cables connected to the elevator for raising and lowering the elevator, a control circuit electrically connected to the hoisting unit for regulating operation thereof including manually operated switches correlated with the load sustaining levels and ground level and operable to cause the elevator to be aligned automatically with the selected level, respective latches associated with the vehicle at the load sustaining levels, tension responsive switches associated with the elevator cables and interconnected electrically with the control circuit to deenergize the hoisting unit when the elevator is sustained by the latches with the cables slack at a selected level, electrical latch retracting means associated with the said latching devices and interconnected with the control circuit to retract the latching devices after one of said selector switches is actuated to move the elevator to ground level, the control circuit being arranged to energize the hoisting unit in elevating direction prior to lowering and thereby to close the tension responsive switches, and the tension responsive switches being interconnected in the circuit to energize the latch retracting means.

11. In an elevator control system having a power unit including an electrical control system, an elevator, guide means for the elevator, latching means associated with the guide means for supporting the elevator at selected levels, means for releasing said latching means, a cable connecting the power unit to the elevator for raising and lowering the same, a pivotally mounted arm having an end yieldably urged against the cable, a switch associated with the said arm and in electrical connection with the control system, said switch being adapted to cause the control system to deenergize the power unit when the cables are slack with the elevator supported by the said latches.

12. In a vehicle body having sets of load sustaining rails, an elevator mounted at an open end of the body, doors mounted with respect to the body opening and arranged to overlie the elevator, an electrical power unit connected to the elevator, lift arms extending rearwardly from the elevator and adapted to be levelled selectively adjacent the load sustaining rails, the lift arms being hingedly mounted upon the elevator and adapted to be folded against the elevator when the said doors are closed, and a door operated safety switch interconnected with the electrical power unit and adapted to deenergize the power unit when the doors are closed.

13. In a vehicle elevator adapted to travel between the ground level and a vehicle level, a pair of vertical spaced elevator guides mounted upon the vehicle, the elevator including a pair of shoes slideably confined in said vertical guides, the elevator having a horizontal cross member secured to the shoes and a pair of lift arms extending horizontally from said cross member, a power unit having a respective cable secured to each of said shoes for raising and lowering the elevator, an electrical control system including manually operated switches for regulating the power unit, and a slack cable switch associated with each of said cables and interconnected electrically with the control system, each of said switches being responsive to cable tension and adapted to deenergize the power unit when the elevator contacts the ground with one or both of said cables in slack condition.

14. In a vehicle elevator adapted to travel between the ground level and a series of load sustaining rails, a pair of vertical spaced elevator guides mounted upon the vehicle, the elevator including a pair of shoes slideably confined in said vertical guides, the elevator having a horizontal cross member secured to the shoes and a pair of lift arms extending horizontally from said cross member, a power unit having a respective cable secured to each of said shoes for raising and lowering the elevator, respective pairs of latches mounted on the elevator guides at positions to latch the said shoes against downward movement when the lift arms are in flush relationship with the respective load sustaining rails, an electrical control system including manually operated switches for regulating the power unit, and a slack cable switch associated with each of said cables and connected electrically to the control system, each of said switches being responsive to cable tension and adapted to deenergize the power unit when said shoes are engaged by said latches at the load sustaining rails or when the elevator contacts the ground with one or both of said cables in slack condition.

15. In a vehicle having a horizontal load sustaining level, an elevator mounted upon the vehicle and adapted to move vertically between the ground level and load sustaining level, a pair of lift arms mounted upon the elevator and adapted to transfer freight with respect to the load sustaining level and ground level, power means for raising and lowering the elevator, an inclined latch associated with the vehicle and adapted to support the elevator with the lift arms levelled in flush relationship with the load sustaining level, said latch being adapted to be engaged and retracted mechanically by the elevator during upward travel thereof and to move to an extended position after movement of the elevator above the latch whereby the elevator may be lowered into engagement therewith and in flush relationship with the load sustaining level, and power means connected to the latch and operable to retract the same when the elevator is moved upwardly out of engagement therewith, whereby the latch may be held in retracted position during downward movement of the elevator.

16. In a vehicle having sets of horizontal load sustaining rails at a plurality of elevations, a pair of vertical guide members, an elevator slidably mounted with respect to the guide members and adapted to move vertically with respect to the load sustaining rails and the ground level, a pair of horizontal lift arms mounted upon the elevator and adapted to transfer freight with respect to the load sustaining rails and ground level, power means including cables for raising and lowering the elevator, respective pairs of inclined latches associated with the guide members and adapted to support the elevator at said load sustaining rails with the lift arms levelled in flush relationship with the load sustaining rails, said latches including means for yieldably urging the same to an extended position, the latches being adapted to be engaged and retracted mechanically by the elevator during upward travel thereof, and to move to an extended position after movement of the elevator above the latches whereby the elevator may be lowered into load supporting engagement therewith and in flush relationship with the respective load sustaining rails, and power means connected to the latches and operable to retract the same when the elevator is moved upwardly out of engagement therewith, whereby the latches may be held in retracted position during downward movement of the elevator.

17. In a vehicle having a plurality of horizontal load sustaining rails, an elevator associated with the vehicle and arranged to be translated vertically with respect to the load sustaining rails, a pair of spaced vertical elevator guide members mounted on the vehicle, a power unit including cables connected to the elevator for raising and lowering the same, respective pairs of inclined latch arms mounted upon said vertical guide members, said latch arms being related to the load sustaining rails and adapted to support the elevator in flush relationship with said rails, said latch arms being located in the path of travel of the elevator and arranged to be engaged and moved by the elevator to a retracted position during upward movement of the elevator, the latch arms being arranged to move to an extended latching position after movement of the elevator above the latch arms whereby the elevator may be lowered into supporting engagement upon the latch arms, and a pair of safety catches mounted on the elevator and connected to the cables and adapted to transmit the pull of the cables to the elevator, the catches being constructed and arranged to be held in retracted position by the tension of the cables and to be extended when the tension is removed, said guide members including apertures adapted to engage the safety catches when said cables become slack either through breakage or with the elevator resting upon the said latch arms at the load sustaining rails, whereby the elevator is locked positively against vertical movement at said load sustaining rails until said cables are tensioned by the power unit, said safety catches being operable to support the elevator intermediate the load sustaining rails independently of said latch arms upon breakage of either of said cables.

18. In a vehicle having pairs of spaced horizontal load sustaining rails at a plurality of elevations, an elevator mounted upon the vehicle and adapted to move vertically with respect to the said load sustaining rails and ground level, the elevator having a pair of spaced horizontal lift arms adapted to transfer freight relative to the ground level and load sustaining rails, said lift arms being adapted to reside in parallelism and in flush relationship with the load sustaining rails, whereby the freight may be transferred horizontally from the lift arms to the load sustaining rails when the lift arms are levelled with respect to the load sustaining rails, power means including cables for raising and lowering the elevator with respect to the load sustaining rails, and latch arms adapted to support the elevator with the lift arms levelled with respect to the load sustaining rails, said latch arms being adapted to be engaged by the elevator and moved to a retracted position during upward movement of the elevator and being adapted to move to an extended position after movement of the elevator above the latching member whereby the elevator may be lowered into engagement therewith with the lift arms in flush relationship with the load sustaining rails.

19. In a vehicle having pairs of spaced horizontal load sustaining rails at a plurality of elevations, an elevator mounted upon the vehicle and adapted to move vertically with respect to the said load sustaining rails and ground level, a pair of spaced vertical elevator guides mounted on the vehicle, the elevator having a pair of shoes slideably confined in the said guides and having a horizontal cross member connected to said shoes, a pair of spaced horizontal lift arms mounted upon the cross member and adapted to transfer freight relative to the ground level and load sustaining rails, said lift arms being extended at right angles from the cross member and adapted to reside in parallelism and in flush relationship with the load sustaining rails, whereby the freight may be transferred horizontally from the lift arms to the load sustaining rails when the lift arms are levelled with respect to the load sustaining rails, power means including cables for raising and lowering the elevator with respect to the load sustaining rails, and latching members mounted on the elevator guides and adapted to support the elevator with the lift arms levelled with respect to the load sustaining rails, said latching members being adapted to be engaged by the elevator and moved to a retracted position during upward movement of the elevator and being adapted to move to an extended position after movement of the elevator above the latching member whereby the elevator may be lowered into engagement therewith with the lift arms in flush relationship with the load sustaining rails.

20. In an elevator system for a vehicle comprising an elevator adapted to travel between ground level and vehicle level, power means connected to the elevator for raising and lowering the same with respect to said levels, an electrical control system including manually operable switch means for regulating the said power means, a movable latch arm associated with said vehicle, the said arm being positioned in the path of movement of said elevator for engagement thereof and movement thereby to a retracted position during upward movement of the elevator, means for moving the said latch arm to support position beneath the elevator after the elevator has moved above said latch arm, the said latch arm being positioned to support the said elevator against downward movement at the said vehicle level, and the said electrical control system including means responsive to the movement of the elevator above said latch arm for lowering the elevator into engagement with said latch arm.

21. In an elevator system for a vehicle comprising an elevator adapted to travel between ground level and vehicle level, power means connected to the elevator for raising and lowering the same with respect to said levels, an electrical control system including manually operable switch means for regulating the said power means, a movable latch arm associated with said vehicle, the said arm being positioned in the path of movement of said elevator for engagement thereof and movement thereby to a retracted position during upward movement of the elevator, means for moving the said latch arm to support position beneath the elevator after the elevator has moved above said latch arm, the said latch arm being positioned to support the said elevator against downward movement at the said vehicle level, the said electrical control system including means responsive to the movement of the elevator above said latch arm for lowering the elevator into engagement with said latch arm, and means responsive to load supporting engagement of the elevator with said latch arm for decommissioning said power means.

JAMES J. BLACK.

References Cited in the file of this patent

UNITED STATES PATENTS

| Number | Name | Date |
|---|---|---|
| 255,646 | McCarroll | Mar. 28, 1882 |
| 1,407,124 | Carr | Feb. 21, 1922 |
| 1,628,390 | Cochran | May 10, 1927 |
| 2,082,393 | Hallenbeck | June 1, 1937 |
| 2,110,239 | Richter | Mar. 8, 1938 |
| 2,151,338 | Shonnard | Mar. 21, 1939 |
| 2,203,310 | Shonnard | June 4, 1940 |
| 2,295,895 | Duden | Sept. 15, 1942 |
| 2,408,762 | Dunlop et al. | Oct. 8, 1946 |
| 2,421,128 | Pride | May 27, 1947 |
| 2,459,045 | Pride | Jan. 11, 1949 |
| 2,513,224 | Woodward et al. | June 27, 1950 |
| 2,521,727 | Kappen | Sept. 12, 1950 |
| 2,581,333 | Vawter | Jan. 1, 1952 |